United States Patent
Chao et al.

(10) Patent No.: US 10,129,264 B2
(45) Date of Patent: Nov. 13, 2018

(54) METHOD AND APPARATUS FOR IMPLEMENTING DOCUMENT SHARING BETWEEN USER GROUPS

(71) Applicants: BEIJING KINGSOFT OFFICE SOFTWARE, INC, Beijing (CN); ZHUHAI KINGSOFT OFFICE SOFTWARE CO., LTD, Jida Zhuhai (CN)

(72) Inventors: Yuntong Chao, Jida Zhuhai (CN); Chuantong Huang, Jida Zhuhai (CN); Kongsheng Zhao, Jida Zhuhai (CN); Huan Liu, Jida Zhuhai (CN); Qixu Lang, Jida Zhuhai (CN); Yafei Li, Jida Zhuhai (CN); Ting Fang, Jida Zhuhai (CN)

(73) Assignees: BEIJING KINGSOFT OFFICE SOFTWARE, INC, Beijing (CN); ZHUHAI KINGSOFT OFFICE SOFTWARE CO., LTD, Zhuhai (CN)

(*) Notice: Subject to any disclaimer, the term of this patent is extended or adjusted under 35 U.S.C. 154(b) by 77 days.

(21) Appl. No.: 15/107,843

(22) PCT Filed: Dec. 2, 2014

(86) PCT No.: PCT/CN2014/092792
§ 371 (c)(1),
(2) Date: Jun. 23, 2016

(87) PCT Pub. No.: WO2015/096599
PCT Pub. Date: Jul. 2, 2015

(65) Prior Publication Data
US 2016/0330208 A1 Nov. 10, 2016

(30) Foreign Application Priority Data
Dec. 27, 2013 (CN) .......................... 2013 1 0747046

(51) Int. Cl.
*H04L 29/06* (2006.01)
*G06F 17/30* (2006.01)
(Continued)

(52) U.S. Cl.
CPC ...... *H04L 63/104* (2013.01); *G06F 17/30011* (2013.01); *G06Q 10/101* (2013.01); *H04L 61/1582* (2013.01); *H04L 67/1097* (2013.01)

(58) Field of Classification Search
None
See application file for complete search history.

(56) References Cited

U.S. PATENT DOCUMENTS 9,378,386 B1 * 6/2016 Saylor ................ G06F 21/6245
2004/0172450 A1 * 9/2004 Edelstein .............. G06Q 10/10
709/205

(Continued)

FOREIGN PATENT DOCUMENTS

| CN | 1609858 | 4/2005 |
| CN | 1525375 | 5/2012 |
| JP | 2007058595 | 3/2007 |

*Primary Examiner* — Eric Chen
(74) *Attorney, Agent, or Firm* — Norton Rose Fulbright US LLP

(57) ABSTRACT

Disclosed are a method and an apparatus for implementing document sharing between user groups. The method comprises: receiving document sharing request information sent by a user in a first user group, the document sharing request information carrying an identifier of a target shared document and an identifier of a second user group; sending a shared document instruction to the second user group according to the identifier of the second user group, the shared document instruction carrying an identifier of a to-be-created shared document and an index of the to-be-created shared document and being used for instructing the second user group to create a shared document corresponding to the target shared document, the index of the to-be-
(Continued)

created document being the same as the identifier of the target shared document, for associating the to-be-created document with the target shared document. A document is shared by applying the solutions provided by embodiments of this application, and after a user in a first user group edits a target document, the shared document can be synchronously updated in a second user group.

6 Claims, 3 Drawing Sheets

(51) Int. Cl.
    *G06Q 10/10*     (2012.01)
    *H04L 29/12*     (2006.01)
    *H04L 29/08*     (2006.01)
    *G06F 7/04*     (2006.01)
    *H04N 7/16*     (2011.01)

(56) References Cited

U.S. PATENT DOCUMENTS

| | | | |
|---|---|---|---|
| 2005/0198132 A1* | 9/2005 | Vellante | G06Q 10/10 709/204 |
| 2010/0064004 A1* | 3/2010 | Ravi | G06F 17/2288 709/204 |
| 2013/0290464 A1* | 10/2013 | Barrall | G06F 15/167 709/213 |
| 2014/0143434 A1* | 5/2014 | Sanche | H04L 67/26 709/228 |
| 2015/0312331 A1* | 10/2015 | Crocker | H04L 63/061 709/205 |

* cited by examiner

METHOD AND APPARATUS FOR IMPLEMENTING DOCUMENT SHARING BETWEEN USER GROUPS

The present application is a national phase application under 35 U.S.C. § 371 of International Patent Application No. PCT/CN2014/092792 filed Dec. 2, 2014, which claims priority to Chinese patent application No. 201310747046.5 entitled "Method and Device for Document Sharing Between User Groups" filed on Dec. 27, 2013. The disclosures of the referenced applications are incorporated into the present application by reference.

TECHNICAL FIELD

The present application relates to the technical field of network communication, and in particular, relates to a method and apparatus for implementing document sharing between user groups.

BACKGROUND ART

With the rapid development of network communication technologies, the sharing of the same document at the server end by multiple users can greatly facilitate working. However, usually, only the users in a same user group can share the shared documents in the user group.

Suppose there are two user groups on the current server end, a user group A and a user group B, and the document X is a shared document in the user group A, then all the users in the user group A can browse Document X, while none of the users in the user group B can browse Document X. In practical applications, there exist the following needs: for sharing Document X with the user group B so as to allow all users in the user group B being able to browse Document X. To meet the above needs, in the prior art, Document X in the user group A is usually copied to the user group B, the document copied to the user group B is denoted by Document X', and users in the user group B can achieve the objective of browsing Document X by browsing Document X'. However, in this situation, Document X' and Document X are two documents independent from each other. After a user in the user group A has edited Document X, the user group B cannot update Document X' synchronously.

SUMMARY OF THE INVENTION

Embodiments of the present application disclose a method and apparatus for implementing document sharing between user groups, such that after the document shared between different groups has been edited in one user group, it is possible to synchronously update in other user groups.

In order to achieve the above objective, the embodiments of the present application disclose a method and apparatus for implementing document sharing between user groups. The method comprises:

receiving document sharing request information sent by a user in a first user group, wherein the document sharing request information carries an identifier of a target shared document and an identifier of a second user group; and sending a document sharing instruction to the second user group according to the identifier of the second user group, wherein the document sharing instruction carries an identifier of the shared document to be created and an index of the shared document to be created and is used to instruct the second user group to create a shared document corresponding to the target shared document, wherein, the index of the shared document to be created is identical to the identifier of the target shared document, and is used to associate the document to be created with the target shared document.

In a specific implementation of the present application, the document sharing instruction comprises:

an instruction used to trigger the second user group to automatically create the shared document according to the identifier of the shared document to be created and the index of the shared document to be created; or information used to provide an interface for user operation, the second user group creating the shared document to be created according to an operation of a user in the second user group on the interface.

In a specific implementation of the present application, the step of sending a document sharing instruction to the second user group comprises:

sending, to users in the second user group who are authorized to receive shared document information, the information used to provide the interface for user operation.

In a specific implementation of the present application, before the step of sending information used to provide an interface for user operation to users in the second user group who are authorized to receive shared document information, the method for implementing document sharing between user groups may further comprise:

obtaining a list of users in the second user group; and selecting users who are authorized to receive shared document information from the list of users.

In a specific implementation of the present application, the method for implementing document sharing between user groups further comprises: pushing a notification message for an added shared document to all users in the second user group.

An identifier of the added shared document is carried in the notification message for the added shared document, wherein, the identifier of the added shared document is the identifier of the shared document to be created.

In order to achieve the above objective, embodiments of the present application provide an apparatus for implementing document sharing between user groups, the apparatus comprises:

an information receiving module used for receiving document sharing request information sent by a user in a first user group, wherein the document sharing request information carries an identifier of a target shared document and an identifier of a second user group; and an instruction sending module used for sending a document sharing instruction to the second user group according to the identifier of the second user group, wherein the document sharing instruction carries an identifier of the shared document to be created and an index of the shared document to be created and is used to instruct the second user group to create a shared document that corresponds to the target shared document, wherein, the index of the document to be created is identical to the identifier of the target shared document and is used to associate the document to be created with the target shared document.

In a specific implementation of the present application, the instruction sending module is specifically used for:

sending, to the second user group according to the identifier of the second user group, an instruction used to trigger the second user group to automatically create the shared document according to the identifier of the shared document to be created and the index of the share document to be created; or sending, to the second user group according to the identifier of the second user group, information used to provide an interface for user operation, the second user group creating the shared document to be created according to an operation of a user in the second user group on the interface.

In a specific implementation of the present application, the instruction sending module is specifically used for sending, to users in the second user group who are authorized to receive shared document information according to the identifier of the second user group, information used to provide an interface for user operation.

In a specific implementation of the present application, the apparatus for implementing document sharing between user groups further comprises:

a user list obtaining module used for obtaining a list of users in the second user group before sending, to users in the second user group who are authorized to receive shared document information, the information used to provide the interface for user operation; and a user selecting module used for selecting users who are authorized to receive shared document information from the list of users.

In a specific implementation of the present application, the apparatus for implementing document sharing between user groups further comprises:

a notification message pushing module used for pushing a notification message for an added shared document to all users in the second user group; an identifier of the added shared document is carried in the notification message for the added shared document, wherein, the identifier of the added shared document is the identifier of said shared document to be created.

In order to achieve the above objective, embodiments of the present application provide an electronic device, the electronic device comprises:

a processor, a memory, communication interfaces, and a bus;

the processor, the memory, and the communication interfaces are connected and communicate with each other by the bus;

the memory stores executable programming codes;

the processor executes programs corresponding to the executable programming codes by reading the executable programming codes stored in the memory, so as to carry out any one of the methods for implementing document sharing between user groups provided by the embodiments of the present application.

In order to achieve the above objective, embodiments of the present application disclose a storage medium, which is used to store an application program. The application program is used to carry out any one of the methods for implementing document sharing between user groups provided by the embodiments of the present application.

In order to achieve the above objective, embodiments of the present application disclose an application program, which is used to carry out any one of the methods for implementing document sharing between user groups provided by the embodiments of the present application.

As can be seen from above, in the solution provided by the embodiments of the present application, the server end pushes document sharing instructions to a second user group according to the identifier of the second user group in the document sharing request information sent by users in a first user group. Because the index of a shared document to be created in the document sharing instructions is associated with the identifier of the target shared document, when users in the second user group are browsing the shared document created according to the document sharing instructions, the users are actually browsing the target shared document in the first user group through the association relationship. Therefore, after users in the first user group have edited the target shared document, the shared document can be updated synchronously in the second user group.

BRIEF DESCRIPTION OF THE DRAWINGS

In order to describe embodiments of the present invention and technical solutions in prior art more clearly, drawings needed to be used in embodiments of the present invention and the prior art will be described briefly below. It is obvious that the drawings below are only for some embodiments of the present invention and those skilled in the art may also obtain further drawings based on these drawings without creative efforts.

DETAILED DESCRIPTION

In the prior art, when a certain document in a current user group is to be shared with another user group, the document can be shared with the other user groups only by way of copying the document. In this situation, after a user in the current user group has edited the document, it is impossible to achieve synchronously update in the other user groups. Therefore, the embodiments of the present application provide a method and apparatus for implementing document sharing between user groups.

A method for implementing document sharing between user groups provided by the embodiments of the present application is first described below; the method can comprise the following steps of:

receiving document sharing request information sent by a user in a first user group; and according to an identifier of a second user group, sending a document sharing instruction to the second user group.

Figure 1:
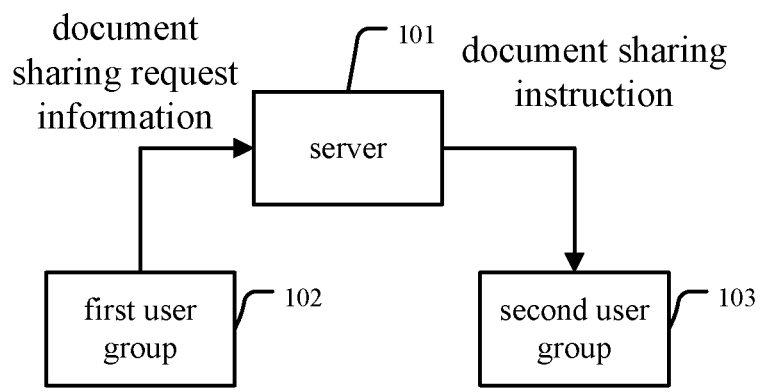
FIG. 1 is a structural schematic view of a system for implementing document sharing between user groups provided by an embodiment of the present application.

The execution entity of the above steps can be a server, and of course may also be other devices that have similar functions, wherein the first user group and the second user group are two user groups existing on the server end. Wherein, the first user group and the second user group may store shared documents in corresponding positions on the server end. Users in the first user group and the second user group can log onto the server via terminals such as computers, tablets, and mobile phones and browse shared documents of corresponding work groups stored in the server, but users in the second user group cannot browse the shared documents of the first user group. If it is desired for users in the second user group being able to browse a certain shared document of the first user group, it may be achieved by way of document sharing. Specifically, referring to FIG. 1, which is a structural schematic view of a system for implementing document sharing between user groups provided by embodiments of the present application. Wherein, a server 101, after receiving document sharing request information sent by a user in a first user group 102, analyzes the document sharing request information, and according to an identifier of a second user group 103 obtained by the analysis, sends a document sharing instruction to the second user group 103. The second user group 103, after receiving the document sharing instruction, creates a shared document in the second user group 103, such that users in the second user group 103 may browse the corresponding document in the first user group 102 through that shared document.

The present invention will be further described in detail with reference to the drawings and the embodiments so as to make the objects, technical solutions and advantages of the present invention more apparent and easier to be understood. Obviously, the embodiments descried are only a part of embodiments of the present invention, and not all the embodiments thereof. Other embodiments obtained by an ordinary skilled in the art without any creative effort based on the embodiments of the present invention all fall into the protection scope of the present invention.

The present application is described in detail below by way of particular embodiments.

Figure 2:
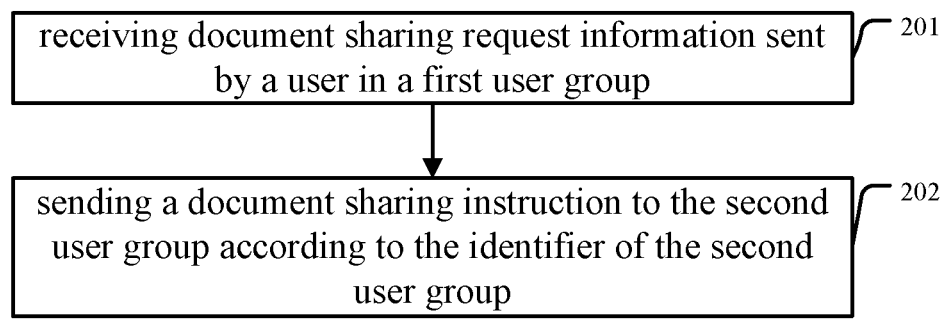
FIG. 2 is a schematic flowchart of a method for implementing document sharing between user groups provided by an embodiment of the present application.

FIG. 2 is a schematic flowchart of a method for implementing document sharing between user groups provided by an embodiment of the present application, the method comprises the following steps.

In step 201: document sharing request information sent by a user in a first user group is received.

In this step, an identifier of a target shared document, an identifier of a second user group, etc. may be carried in the document sharing request information.

In practical applications, information can be shared between user groups by way of document sharing to facilitate collaborative working. For example, there are a user group A and a user group B on the server end, wherein shared documents in the user group A contain Document X, then all users in the user group A can browse Document X, but users in the user group B cannot browse Document X. If it is desired that all users in the user group B can also browse Document X, then it can be achieved by way of document sharing between user groups.

Wherein, user groups can be work groups, dialog groups, collaborative relationships in collaborative working, etc. Of course, the present application does not limit the particular form of user groups.

The target shared document can be any document in a work group. The document can be a text file, an image file, a video file, an audio file, etc.

When a user in the first user group initiates a document sharing request, one or more documents in the shared documents of the first user group can be shared with other user groups. In the case of sharing multiple documents, identifiers of multiple target shared documents must be carried in the document sharing request information simultaneously.

In addition, users in the first user group can also share the shared documents in the first user group with multiple user groups. In this situation, identifiers of other user groups, in addition to the identifier of the second user group, must be carried in the document sharing request information.

Further, identifiers of users in the second user group who receive the information can also be carried in the document sharing request information. In practical applications, information carried in the document sharing request information can be adjusted according to the actual circumstances, and the present application does not limit the information carried in the document sharing request information.

Usually, a user group can include more than two users, and each user's authority can be configured, for example, it can be configured whether a user is authorized to send document sharing request information, and only users who are of such authority may send document sharing request information to the server end. In specific application, some or all users in a user group can be configured to be authorized to send document sharing request information. In other words, the document sharing request information sent by users in the first user group and received by the server is the document sharing request information sent by users in the first user group who are authorized to send document sharing request information.

In step 202: according to an identifier of a second user group, a document sharing instruction is sent to the second user group.

In this step, an identifier of a shared document to be created, an index of the shared document to be created and so on can be carried in the document sharing instruction. This document sharing instruction is used to instruct the second user group to create a shared document corresponding to the target shared document.

Wherein, the index of the document to be created is identical to the identifier of the target shared document, and is used to associate the document to be created with the target shared document.

After the server has received the document sharing request information sent by a user in the first user group, it analyzes the information, obtains the identifier of the second user group from the information, and according to the identifier, sends a document sharing instruction to the second user group. After the first user group has shared the target document with the second user group, the target shared document should be visible to users in the second user group, and should be browsable. Thus, a document that corresponds to the target document needs to be created in the second user group, so as to achieve the objective that users in the second user group can browse the document. It can be understood by one skilled in the art that, the identifier of the document to be created in the second user group needs to be different with the identifier of the target document, so as to differentiate the two documents. Take the example of the example in Step 201, if the user in the user group A shares Document X with the user group B, then the user group B, after receiving the document sharing instruction sent by the server end, needs to create a document in the user group B corresponding to Document X, supposing this document is denoted by X'.

Wherein, the document sharing instruction can be an instruction used to trigger the second user group to automatically create the shared document based on the identifier of the shared document to be crated and the index of the shared document to be created. That is to say, the second user group, after receiving the document sharing instruction, creates a shared document that corresponds to the target document in the first user group, for example, the shared document X', according to the identifier of the shared document to be created and the index of the shared document to be created carried in the instruction. The document sharing instruction can also be information that is used to provide an interface for user operation. The second user group creates the shared document to be created according to an operation of a user in the second user group on the interface. For example, information of the interface for user operation can be dialogue box information that contains information of the document to be created. The second user group can create the shared document to be created after the user in the second user group has selected the operation of Accept on the dialogue box. Of course, the user in the second user group can also select the operation of Refuse on the dialogue box, thus refusing to create the shared document to be created in the second user group, i.e., refusing to receive the shared document.

Usually, a document must have identifying information of the document. When a user in a work group wants to browse a certain document shared in that work group, the user can identify that document by the identifying information of the document and browse it. However, documents in the present embodiment are also needed to have index information of the document in addition to the identifying information of the document. Wherein, the index information of the document is mainly used to associate the current document with other documents, and is mainly used in the present embodiment to associate the document to be created in the second user group with the target document in the first user group. When a user identifies the current document by the identifier of the current document and browses it, the user is actually browsing a document that corresponds to the index of the current document. Specifically, the document to be created in the second user group is associated with the target document in the first user group, and after the document to be created has been created, when a user in the second user group is browsing the created document, the user is actually linked to the target document in the first user group by the index information of the document, and browses the target document. Therefore, when a user in the first user group has edited and saved the target document, the document in the second user group can be linked and updated synchronously.

It is to be noted that, when the current document is not associated with other documents, the index information of the current document is empty; and when the current document is associated with a certain document, the index information of the current document is configured to be the identifier of the associated document.

For example, assuming that the identifier of Document X in a user group A is xxxx, and the identifier of Document X' in a user group B is yyyy, xxxx and yyyy are different with each other, and Document X is not associated with other documents, then the index of Document X is empty, and the index of the document X' is xxxx. When a user in the user group B browses the document X', the document is identified through the identifier yyyy and then browsed. The user is actually linked to the document X in the user group A, of which the identifier is xxxx, through the index of the document X', xxxx, and browses the document X.

In another specific embodiment of the present application, after a shared document has been created in the second user group, a notification message for an added shared document can also be pushed to all users in the second user group. Wherein, the identifier of the added shared document, which is the identifier of the shared document that has been created, is carried in the notification message for the added shared document. Of course, this is merely used as an example to illustrate the present application. In practical applications, information carried in a notification message for an added shared document is not limited to this, for example, a work group that shares the shared document, users in a second work group who receive the shared document, etc. can also be carried.

Persons skilled in the art can understand that, when users in the second user group are browsing the shared document created, they can also edit the document and save it on the server end in the meantime. After users in the second user group have edited the document, the server end can also send a notification message for shared document update to users in the first user group so as to timely inform users in the first user group of update status of the shared document. Of course, when the first user group is sharing the shared document, authorities for the shared document, for example, the authority to edit the shared document, can also be configured for users in the second user group; only users who have the authority to edit the shared document can edit the shared document, so as to prevent the shared document to be updated at will which result in the difficulty of version control, etc.

As can be seen from above, in the present solution, the server end pushes document sharing instructions to the second user group according to the identifier of the second user group in the received document sharing request information sent by users in the first user group. Because the index of the shared document to be created in the document sharing instructions is associated with the identifier of the target shared document, when users in the second user group are browsing the shared document created according to the document sharing instructions, the users are actually browsing the target shared document in the first user group through the association relationship. Therefore, after the target shared document has been edited by users in the first user group, the shared document can be updated synchronously in the second user group.

Figure 3:
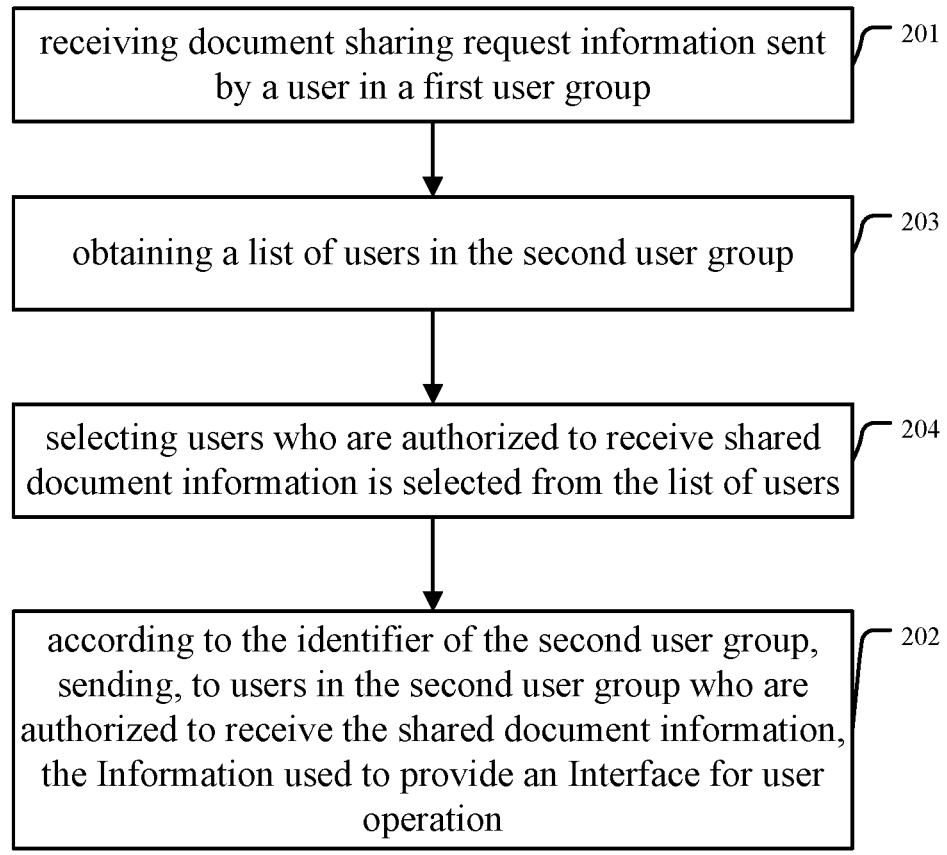
FIG. 3 is a schematic flowchart of another method for implementing document sharing between user groups provided by an embodiment of the present application.

Because the document sharing instruction sent by the server end to the second user group can be information used to provide an interface for user operation, and the operation interfaces information can be only sent to users with certain authority, the present application provides another embodiment for this purpose. FIG. 3 is the flow chart of another method for implementing document sharing between user groups provided by the embodiments of the present application. Compared with the embodiment illustrated by FIG. 2, step 205 in the present embodiment is the specific mode of execution of the embodiment illustrated by FIG. 2. Meanwhile, step 203 and step 204 are added in the present embodiment.

In step 203: a list of users in the second user group is obtained.

Step 204: users who are authorized to receive shared document information is selected from the list of users.

In practical applications, the obtaining of information of users who are authorized to receive shared document information can also be achieved by other means, for example: by means of designation by the user in the first user group who sends the document sharing request information. The present application does not limit the means by which information of users who are authorized to receive the shared document information is obtained.

In step 205: according to the identifier of the second user group, information used to provide an interface for user operation is sent to users in the second user group who are authorized to receive the shared document information.

In another particular embodiment of the present application, after the shared document has been created in the second user group, a notification message for an added shared document can also be pushed to all users in the second user group, so as to inform all users in the second user group, in particular users who are authorized to receive shared document information, of the message that a new shared document has been added in the user group. Wherein, the identifier of the added shared document, which is the identifier of the shared document that has been created, is carried in the notification message of the added shared document. Of course, this is merely used as an example to illustrate the present application. In practical applications, the messages carried in the notification message of shared document addition are not limited to this, for example, the work group that shares the shared document, the users in the second user group that receive the shared document, etc. can also be carried.

It can be seen from above that, in the present solution, by sending, to users who are authorized to receive shared document information, the information used to provide an interface for user operation, the sending of messages is more targeted; by obtaining information of users who are authorized to receive shared document information by way of a user list, less information can be carried in the document sharing request information sent by users in the first user group.

Figure 4:
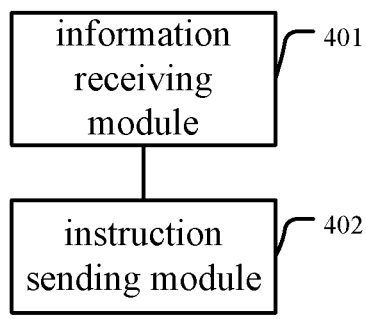
FIG. 4 is a structural schematic view of an apparatus for implementing document sharing between user groups provided by an embodiment of the present application.

FIG. 4 is a structural schematic view of an apparatus for implementing document sharing between user groups provided by the embodiment of the present application. The apparatus may comprise: an information receiving module 401 and an instruction sending module 402.

Wherein, the information receiving module 401 is used for receiving document sharing request information sent by a user in a first user group, wherein the document sharing request information carries an identifier of a target shared document and an identifier of a second user group;

the instruction sending module 402 is used for sending a document sharing instruction to the second user group according to the identifier of the second user group, wherein the document sharing instruction carries an identifier of the shared document to be created and an index of the shared document to be created and is used to instruct the second user group to create a shared document that corresponds to the target shared document, wherein, the index of the document to be created is identical to the identifier of the target shared document and is used to associate the document to be created with the target shared document.

In the present embodiment, the instruction sending module 402 is specifically used for:

sending an instruction that triggers the second user group to automatically create the shared document according to the identifier of the shared document to be created and the index of the share document to be created; or sending information for providing interface for user operation to the second user group, the second user group creating the shared document to be created according to an operation of a user in the second user group on the interface.

In another particular embodiment of the present application, the apparatus also may comprise: a notification message pushing module (not illustrated in the figure).

Wherein, the notification message pushing module is used for pushing a notification message for an added shared document to all users in the second user group; an identifier of the added shared document is carried in the notification message for the added shared document, wherein, the identifier of the added shared document is the identifier of said shared document to be created.

As can be seen above, in the present solution, the server end pushes document sharing instructions to the second user group according to the identifier of the second user group in the received document sharing request information sent by users in the first user group. Since the index of the shared document to be created in the document sharing instructions is associated with the identifier of the target shared document, when users in the second user group are browsing the shared document created according to the document sharing instructions, the users are actually browsing the target shared document in the first user group through the association relationship. Therefore, after users in the first user group have edited the target shared document, the shared document can be updated synchronously in the second user group.

Figure 5:
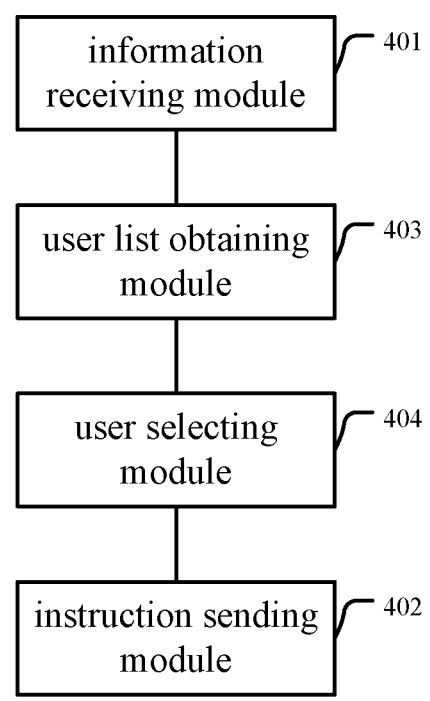
FIG. 5 is a structural schematic view of an apparatus for implementing document sharing between user groups provided by an embodiment of the present application.

Because the document sharing instruction sent to the second user group by the server end can be information for providing interface for user operation, and the operation interfaces information can be sent only to users who have certain authorities, the present application provides another embodiment. FIG. 5 is a structural schematic view of an apparatus for implementing document sharing between user groups provided by the embodiments of the present application. Compared with the embodiment of FIG. 4, a user list obtaining module 403 and a user selecting module 404 are added in the present embodiment.

Wherein, the instruction sending module 402 is specifically used for sending, to users in the second user group who are authorized to receive shared document information according to the identifier of the second user group, information for providing interface for user operation.

The user list obtaining module 403 is used for obtaining a list of users in the second user group before sending, to users in the second user group who are authorized to receive shared document information, the information for providing interface for user operation.

The user selecting module 404 is used for selecting users who are authorized to receive shared document information from the list of users.

It can be seen from above that, in the present solution, by sending, to users who are authorized to receive shared document information, the information for providing interface for user operation, the sending of messages is more targeted; by obtaining information of users who are authorized to receive shared document information by way of a user list, less information can be carried in the document sharing request information sent by users in the first user group.

In addition, the embodiment of the present application also provides an electronic device, which can comprise:

a processor, a memory, a communication interface, and a bus;

The process, the memory, and the communication interface are connected to and communicate with each other by the bus;

The memory stores executable programming codes;

The processor executes programs corresponding to the executable programming codes by reading the executable programming codes stored in the memory, so as to carry out the method for implementing document sharing between user groups provided by the embodiments of the present application; wherein, the method for implementing document sharing between user groups provided by the embodiments of the present application can comprise:

receiving document sharing request information sent by a user in a first user group, wherein the document sharing request information carries an identifier of a target shared document and an identifier of a second user group; and sending a document sharing instruction to the second user group according to the identifier of the second user group, wherein the document sharing instruction carries an identifier of the shared document to be created and an index of the shared document to be created and is used to instruct the second user group to create a shared document corresponding to the target shared document, wherein, the index of the shared document to be created is identical to the identifier of the target shared document and is used to associate the document to be created with the target shared document.

Wherein, the document sharing instruction comprises:

an instruction used to trigger the second user group to automatically create the shared document according to the identifier of the shared document to be created and the index of the shared document to be created; or information used to provide an interface for user operation, the second user group creating the shared document to be created according to an operation of a user in the second user group on the interface.

Wherein, the step of sending the document sharing instruction to the second user group comprises:

sending, to users in the second user group who are authorized to receive shared document information, the information used to provide an interface for user operation.

Wherein, before the step of sending, to users in the second user group who are authorized to receive shared document information, the information used to provide the interface for user operation, the method further comprises:

obtaining a list of users in the second user group; and selecting users who are authorized to receive shared document information from the list of users.

Wherein, the method for implementing document sharing between user groups also comprises: pushing a notification message for an added shared document to all users in the second user group;

an identifier of the added shared document is carried in the notification message for the shared document addition, wherein, the identifier of the added shared document is the identifier of the shared document to be created.

In addition, the embodiments of the present application also provides a storage medium for storing application programs, the application programs are used for carrying out execute a method for implementing document sharing between user groups provided by the embodiments of the present application; wherein, the method for implementing document sharing between user groups provided by the embodiments of the present application can comprise:

receiving document sharing request information sent by a user in a first user group, wherein the document sharing request information carries an identifier of a target shared document and an identifier of a second user group; and sending a document sharing instruction to the second user group according to the identifier of the second user group, wherein the document sharing instruction carries an identifier of the shared document to be created and an index of the shared document to be created and is used to instruct the second user group to create a shared document corresponding to the target shared document, wherein, the index of the shared document to be created is identical to the identifier of the target shared document, and is used to associate the document to be created with the target shared document.

Wherein, the document sharing instruction comprises:

an instruction used to trigger the second user group to automatically create the shared document according to the identifier of the shared document to be created and the index of the shared document to be created; or information used to provide an interface for user operation, the second user group creating the shared document to be created according to an operation of a user in the second user group on the interface.

Wherein, the step of sending the document sharing instruction to the second user group comprises:

sending, to users in the second user group who are authorized to receive shared document information, the information used to provide an interface for user operation;

wherein, before the step of sending, to users in the second user group who are authorized to receive shared document information, the information used to provide the interface for user operation, the method further comprises:

obtaining a list of users in the second user group; and selecting users who are authorized to receive shared document information from the list of users.

Wherein, the method for implementing document sharing between user groups also comprises: pushing a notification message for an added shared document to all users in the second user group;

an identifier of the added shared document is carried in the notification message for the added shared document, wherein, the identifier of the added shared document is the identifier of the shared document to be created.

In addition, embodiments of the present application also provides an application program for executing a method for implementing document sharing between user groups provided by the embodiments of the present application; wherein, the method for implementing document sharing between user groups provided by the embodiments of the present application can comprise:

receiving document sharing request information sent by a user in a first user group, wherein the document sharing request information carries an identifier of a target shared document and an identifier of a second user group; and sending a document sharing instruction to the second user group according to the identifier of the second user group, wherein the document sharing instruction carries an identifier of the shared document to be created and an index of the shared document to be created and is used to instruct the second user group to create a shared document corresponding to the target shared document, wherein, the index of the shared document to be created is identical to the identifier of the target shared document and is used to associate the document to be created with the target shared document.

Wherein, the document sharing instruction comprises:

an instruction used to trigger the second user group to automatically create the shared document according to the identifier of the shared document to be created and the index of the shared document to be created; or information used to provide an interface for user operation, the second user group creating the shared document to be created according to an operation of a user in the second user group on the interface.

Wherein, the step of sending the document sharing instruction to the second user group comprises:

sending, to users in the second user group who are authorized to receive shared document information, the information used to provide an interface for user operation.

Wherein, before the step of sending, to users in the second user group who are authorized to receive shared document information, the information used to provide the interface for user operation, the method further comprises:

obtaining a list of users in the second user group; and selecting users who are authorized to receive shared document information from the list of users.

Wherein, the method for implementing document sharing between user groups also comprises: pushing a notification message for an added shared document to all users in the second user group.

An identifier of the added shared document is carried in the notification message for the added shared document, wherein, the identifier of the added shared document is the identifier of the shared document to be created.

The embodiments of the system are briefly described and reference can be made to the description of the embodiments of the method for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles or devices comprising a series of elements comprise not only those elements listed, but also other elements not specifically listed or the elements intrinsic to these processes, methods, articles, or devices. Without more limitations, elements limited by sentences "comprise(s) a . . . " don't exclude that there are other identical elements in the processes, methods, objects, or devices which comprise these elements.

It can be understood by a person skilled in the art that all or a part of steps in the implementations of the above method can be carried out by related hardware being instructed by programs, which can be stored in computer readable storage medium, such as ROM/RAM, disk and optical disk etc.

Embodiments described above are just preferred embodiments of the present invention, and not indented to limit the scope of the present invention. Any modifications, alternatives, improvements or the like within the spirit and principle of the present invention should be included in the scope of the present invention.

What is claimed is:

1. A method for implementing document sharing between a first user group and a second user group hosted by a server, executed on the server, characterized in that, the method comprises:
  receiving document sharing request information, sent by a user in the first user group, for a target shared document in the first user group on the server, wherein the document sharing request information carries an identifier of a target shared document and an identifier of a second user group;
  sending a document sharing instruction to the second user group according to the identifier of the second user group, wherein the document sharing instruction carries an identifier of the shared document to be created and an index of the shared document to be created and is used to instruct the second user group to create, in the second user group on the server, a shared document corresponding to the target shared document, and wherein, the index of the shared document to be created is identical to the identifier of the target shared document and is used to associate the document to be created with the target shared document; and
  pushing a notification message for an added shared document to all users in the second user group, wherein, an identifier of the added shared document is carried in the notification message for the added shared document, and wherein, the identifier of the added shared document is the identifier of the shared document to be created,
  wherein, the step of sending a document sharing instruction to the second user group comprises: obtaining a list of users in the second user group; selecting users who are authorized to receive shared document information from the list of users; and sending, to users in the second user group who are authorized to receive shared document information, the information used to provide the interface for user operation.

2. The method according to claim 1, characterized in that, the document sharing instruction comprises:
  an instruction used to trigger the second user group to automatically create the shared document according to the identifier of the shared document to be created and the index of the shared document to be created; or
  information used to provide an interface for user operation, wherein the second user group creates the shared document to be created according to an operation of a user in the second user group on the interface.

3. An apparatus for implementing document sharing between a first user group and a second user group hosted by a server, characterized in that, the apparatus comprises:
  a processor; and
  a memory, comprising:
    an information receiving module executed to receive document sharing request information, sent by a user in the first user group, for a target shared document in the first user group on the server, wherein the document sharing request information carries an identifier of a target shared document and an identifier of a second user group;
    an instruction sending module executed to send a document sharing instruction to the second user group according to the identifier of the second user group, wherein the document sharing instruction carries an identifier of a shared document to be created and an index of the shared document to be created and is used to instruct the second user group to create, in the second user group on the server, a shared document corresponding to the target shared document, and wherein, the index of the document to be created is identical to the identifier of the target shared document, and is used to associate the document to be created with the target shared document;
    a notification message pushing module executed to push a notification message for an added shared document to all users in the second user group; wherein an identifier of the added shared document is carried in the notification message for the added shared document, and wherein, the identifier of the added shared document is the identifier of the shared document to be created;
    a user list obtaining module executed to obtain a list of users in the second user group; and
    a user selecting module executed to select users who are authorized to receive shared document information from the list of users;
    wherein, the instruction sending module is specifically executed to send, to users in the second user group who are authorized to receive shared document information, the information used to provide an interface for user operation.

4. The apparatus according to claim 3, characterized in that the instruction sending module is specifically executed to:
  send, to the second user group according to the identifier of the second user group, an instruction used to trigger the second user group to automatically create the shared document according to the identifier of the shared document to be created and the index of the share document to be created; or
  send, to the second user group according to the identifier of the second user group, information used to provide an interface for user operation, wherein the second user group creates the shared document to be created according to an operation of a user in the second user group on the interface.

5. An electronic device, characterized in that, it comprises:
a processor, a memory, communication interfaces, and a bus;
the processor, the memory, and the communication interfaces are connected to and communicate with each other by the bus;
the memory stores executable programming codes;
the processor executes programs corresponding to the executable programming codes by reading the executable programming codes stored in the memory, so as to carry out a method for implementing document sharing between a first user group and a second user group hosted by a server, executed on the server, the method comprising:
receiving document sharing request information, sent by a user in the first user group, for a target shared document in the first user group on the server, wherein the document sharing request information carries an identifier of a target shared document and an identifier of a second user group;
sending a document sharing instruction to the second user group according to the identifier of the second user group, wherein the document sharing instruction carries an identifier of the shared document to be created and an index of the shared document to be created and is used to instruct the second user group to create, in the second user group on the server, a shared document corresponding to the target shared document, and wherein, the index of the shared document to be created is identical to the identifier of the target shared document and is used to associate the document to be created with the target shared document; and
pushing a notification message for an added shared document to all users in the second user group, wherein, an identifier of the added shared document is carried in the notification message for the added shared document, and wherein, the identifier of the added shared document is the identifier of the shared document to be created,
wherein, the step of sending a document sharing instruction to the second user group comprises: obtaining a list of users in the second user group; selecting users who are authorized to receive shared document information from the list of users; and sending, to users in the second user group who are authorized to receive shared document information, the information used to provide the interface for user operation.

6. A non-transitory storage medium, characterized in that, it is used for storing an application program, the application program being used for carrying out a method for implementing document sharing between a first user group and a second user group hosted by a server, executed on the server, the method comprising:
receiving document sharing request information, sent by a user in the first user group, for a target shared document in the first user group on the server, wherein the document sharing request information carries an identifier of a target shared document and an identifier of a second user group;
sending a document sharing instruction to the second user group according to the identifier of the second user group, wherein the document sharing instruction carries an identifier of the shared document to be created and an index of the shared document to be created and is used to instruct the second user group to create, in the second user group on the server, a shared document corresponding to the target shared document, and wherein, the index of the shared document to be created is identical to the identifier of the target shared document and is used to associate the document to be created with the target shared document; and
pushing a notification message for an added shared document to all users in the second user group, wherein, an identifier of the added shared document is carried in the notification message for the added shared document, and wherein, the identifier of the added shared document is the identifier of the shared document to be created,
wherein, the step of sending a document sharing instruction to the second user group comprises: obtaining a list of users in the second user group; selecting users who are authorized to receive shared document information from the list of users; and sending, to users in the second user group who are authorized to receive shared document information, the information used to provide the interface for user operation.

* * * * *